(12) United States Patent
Pfleger et al.

(10) Patent No.: US 6,490,979 B1
(45) Date of Patent: Dec. 10, 2002

(54) INCLINED SHOPPING CART CONVEYOR SYSTEM

(75) Inventors: Robert H. Pfleger, Fox Point, WI (US); Michael H. Sohn, Hartford, WI (US); Craig S. Schmidt, Brown Deer, WI (US)

(73) Assignee: Pflow Industries, Inc., Milwaukee, WI (US)

( * ) Notice: Subject to any disclaimer, the term of this patent is extended or adjusted under 35 U.S.C. 154(b) by 0 days.

(21) Appl. No.: 09/846,812

(22) Filed: May 1, 2001

(51) Int. Cl.[7] .............................................. B61B 10/00
(52) U.S. Cl. .................. 104/172.3; 104/162; 104/128; 198/321; 198/323; 198/718; 198/465.1
(58) Field of Search ................................ 198/321–323, 198/718, 733, 735.3, 867.14, 465.1; 104/127, 128, 162, 165, 172.1, 172.3

(56) References Cited

U.S. PATENT DOCUMENTS

| | | | |
|---|---|---|---|
| 2,109,210 A | 2/1938 | Dunlop | 198/16 |
| 2,802,427 A | 8/1957 | Costa | 104/18 |
| 2,965,049 A | 12/1960 | Royer | 107/57 |
| 3,305,064 A | 2/1967 | Mullis et al. | 198/16 |
| 3,318,432 A | 5/1967 | Mullis et al. | 198/16 |
| 3,395,784 A | 8/1968 | Kanarek | 198/24 |
| 3,446,315 A | 5/1969 | Close | 186/1 |
| 3,580,376 A * | 5/1971 | Loshbough | 198/323 |
| 3,655,013 A | 4/1972 | Weller | 186/1 |
| 3,656,636 A | 4/1972 | Konstantin | 214/8.5 F |
| 3,861,514 A | 1/1975 | Ling | 198/16 |
| 3,947,832 A * | 3/1976 | Rosgen et al. | 198/323 |
| 4,206,708 A * | 6/1980 | Behle | 104/165 |
| 4,235,327 A | 11/1980 | Heusler et al. | 198/326 |
| 4,326,622 A | 4/1982 | Ellzey | 198/322 |
| 4,438,830 A | 3/1984 | Born | 187/12 |
| 4,518,072 A | 5/1985 | Muellner et al. | 194/4 D |
| 4,681,207 A | 7/1987 | Goto et al. | 198/333 |
| 5,476,156 A | 12/1995 | Gerber | 187/245 |
| 5,572,930 A | 11/1996 | Hein | 104/128 |
| 5,785,165 A * | 7/1998 | Stahlhut | 198/323 |
| 5,923,005 A * | 7/1999 | Blondiau et al. | 198/322 |
| 5,996,767 A | 12/1999 | Misawa | 198/321 |
| 6,138,815 A | 10/2000 | Reiners et al. | 198/321 |
| 6,334,522 B2 * | 1/2002 | Haruta et al. | 198/322 |

FOREIGN PATENT DOCUMENTS

| | | |
|---|---|---|
| CH | 403 224 | 11/1966 |
| DE | 1 249 765 | 9/1967 |
| DE | 2456791 | 8/1976 |
| DE | 2916818 | 11/1980 |
| EP | 0012149 | 4/1979 |

* cited by examiner

*Primary Examiner*—Joseph E. Valenza
(74) *Attorney, Agent, or Firm*—Andrus, Sceales, Starke & Sawall, LLP

(57) ABSTRACT

An inclined conveyor for transporting shopping carts between an upper floor and a lower floor. The inclined conveyor includes a continuous conveyor assembly having a conveyor belt including a plurality of spaced drive lugs that engage a shopping cart. The moving conveyor belt transports the shopping cart between the upper and lower floors. The inclined conveyor includes a jam detector that interrupts operation of the conveyor upon detection of a jam along the conveyor. The inclined conveyor further includes sensors that prevent operation of the conveyor assembly if a person is present at either the unloading end or loading end of the conveyor assembly. At least one cart arrester is positioned along the length of the inclined conveyor to prevent uncontrolled descent of a shopping cart along the length of the inclined conveyor.

24 Claims, 10 Drawing Sheets

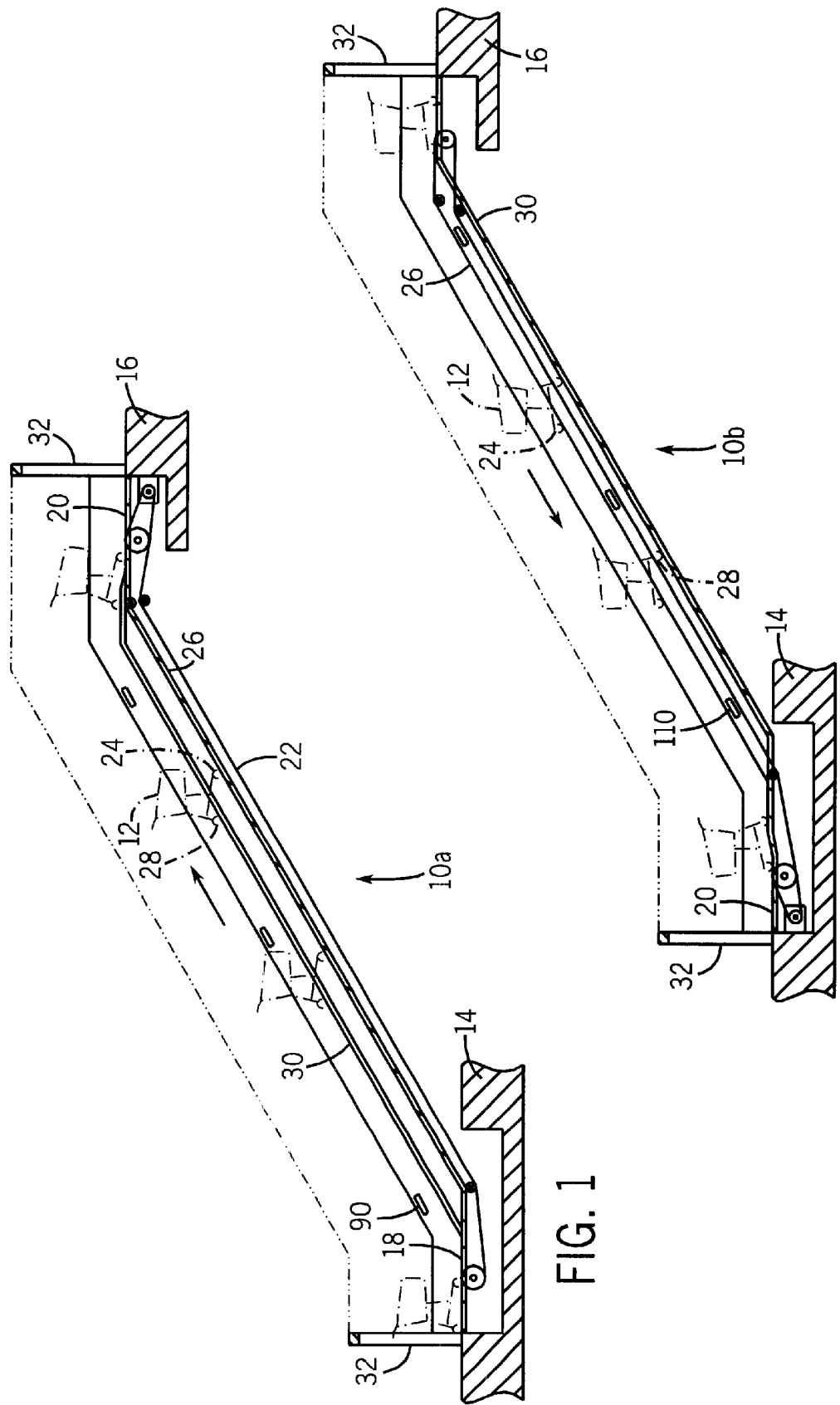

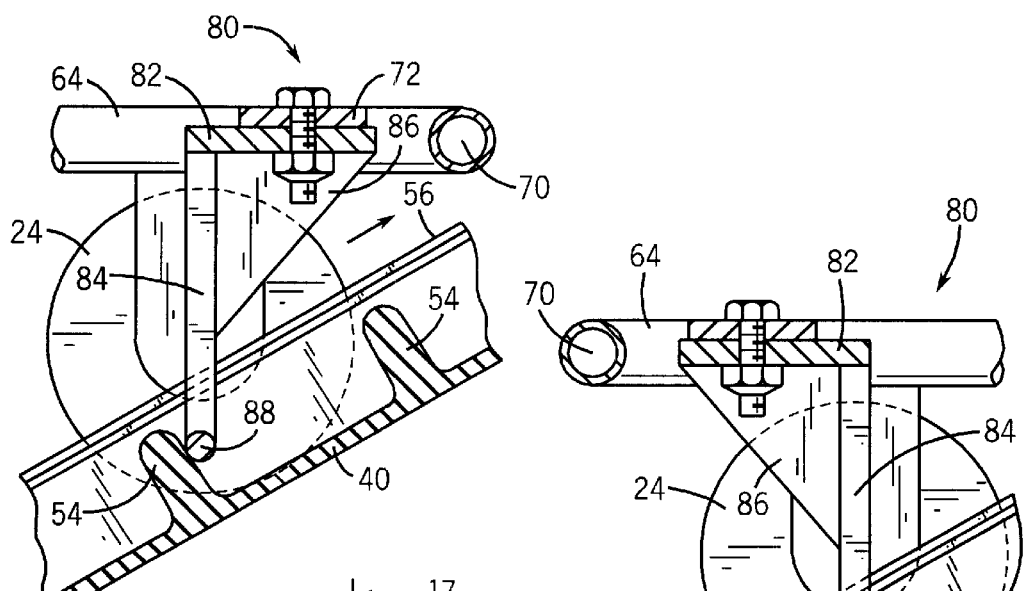
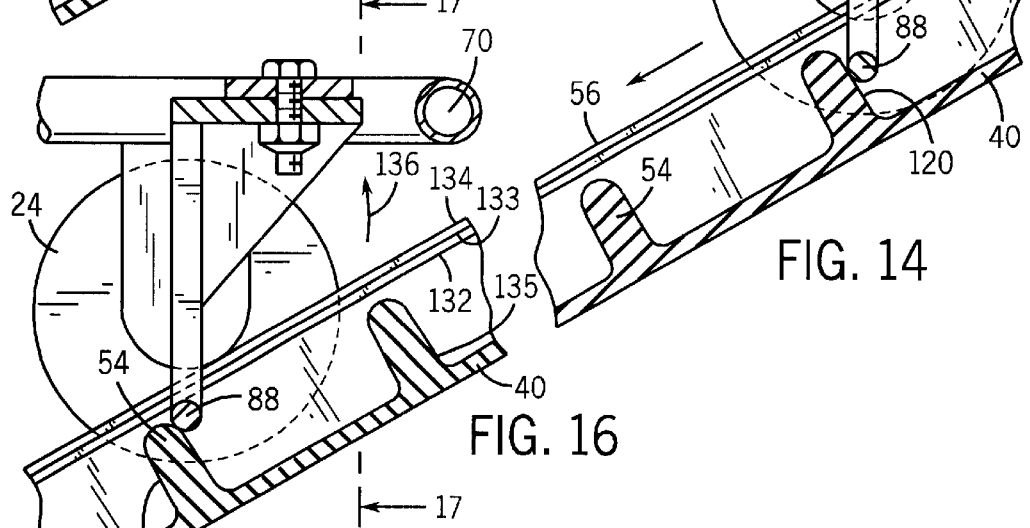
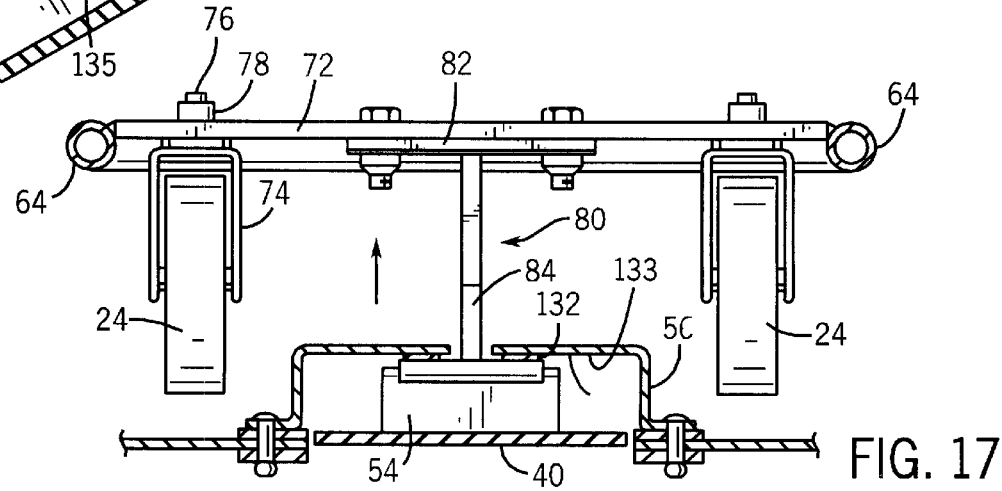

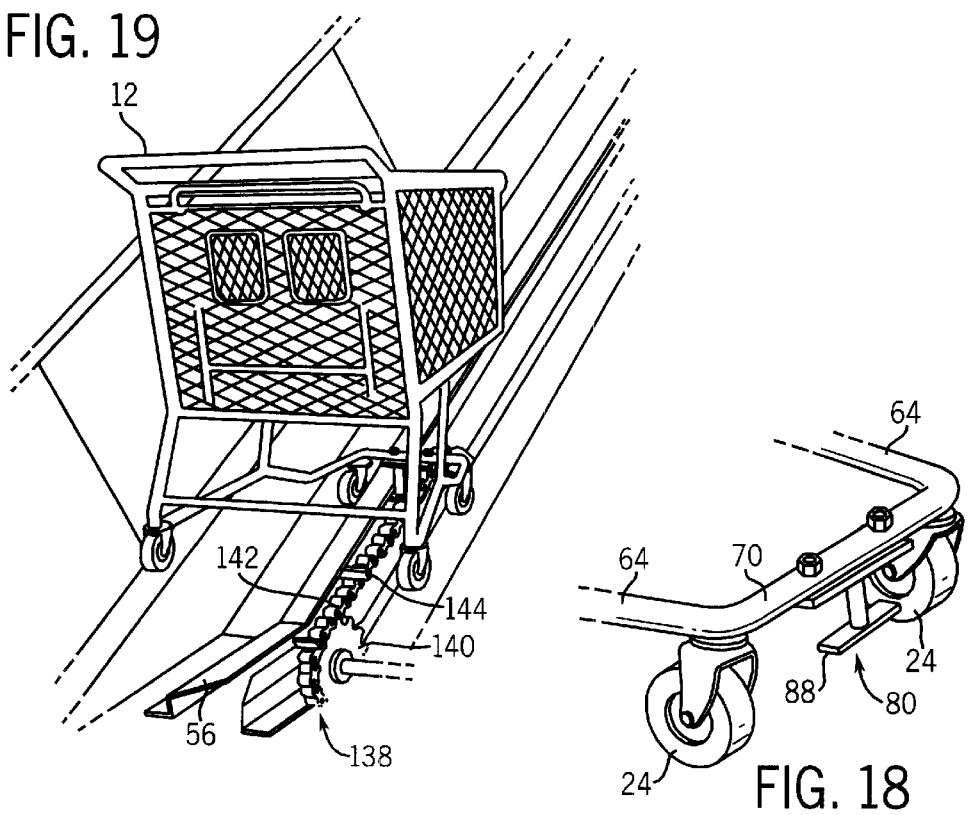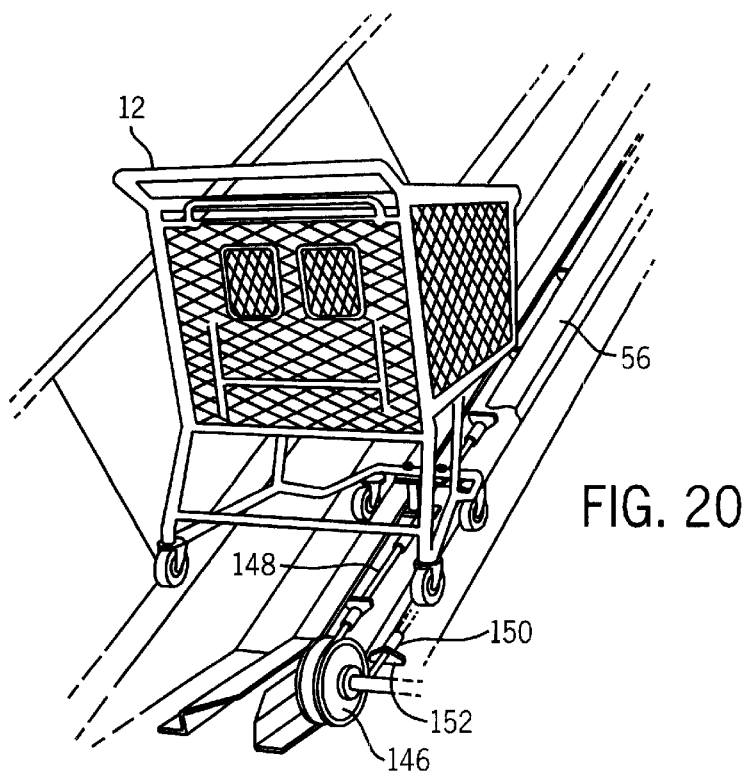

INCLINED SHOPPING CART CONVEYOR SYSTEM

BACKGROUND OF THE INVENTION

The present invention relates to a tow conveyor for moving shopping carts between two different floors of a building. More specifically, the present invention relates to an inclined shopping cart conveyor that can be positioned adjacent to a people-moving escalator such that the shopping cart conveyor moves the shopping carts between two different floors of a building to coincide with the movement of the shoppers.

Currently, most large department stores occupy single floor buildings that include many different product departments and thus have a footprint that covers tens of thousands of square feet. In these large department stores, shoppers typically use shopping carts to carry selected merchandise throughout the store while the shopper continues to select merchandise from the various departments within the store. Since a shopper may be selecting a large number of items having substantial weight, shopping carts are essential in the current department store environment.

Large department stores are most often located in suburban areas where enough land is available to build a store large enough to include all of the merchandise to be offered by the retailer. Thus, many large department store chains have been unable to open stores in large, populated urban areas due to the unavailability of large blocks of single floor retail space. However, in these same urban areas there are often a number of multi-floor vacant buildings that would be large enough to accommodate the floor space required by the department store. Department stores are unable to utilize these multi-floor buildings due to the inability of the department store to transport shopping carts between the various floors of a multi-level store. Although elevators can move shopping carts between he various floors of a multi-floor store, elevators are unable to handle the large number of consumers typically found in one of the large chains of department stores.

Therefore, a need clearly exists for a method of moving shopping carts between various floors of a multi-level department store. Further, a need exists for a system for moving shopping carts along with or simultaneously with the movement of a shopper between the same floors of a department store.

SUMMARY OF THE INVENTION

The present invention relates to an inclined tow conveyor for transporting loaded or unloaded shopping carts between floors of a building. The inclined conveyor of the present invention is constructed to be positioned and used along side a conventional, people-moving escalator such that shopping carts can be loaded onto the inclined shopping cart conveyor and transported along side the shopper who is using the shopping cart.

The inclined shopping cart conveyor of the present invention extends between a loading end and an unloading end. When the inclined conveyor is configured to be an upwardly moving conveyor, a shopping cart is received at the loading end on a lower floor. The shopping cart is received by a continuous conveyor assembly that engages a front portion of the shopping cart and transports the shopping cart upward along the inclined conveyor to the unloading end on an upper floor.

The inclined shopping cart conveyor includes a front wheel track and a rear wheel track that guide the front and rear wheels, respectively, of the shopping cart along the inclined conveyor as a result of the engagement of the shopping cart with the continuous conveyor assembly. The continuous conveyor assembly includes a continuous conveyor belt having a series of spaced drive lugs. Each of the spaced drive lugs positively engages a portion of an engagement bracket mounted near the front end of the shopping cart. In the preferred embodiment of the invention, the engagement bracket includes a generally horizontal cross bar that contacts one of the drive lugs mounted to the conveyor belt. Upon reaching the upper floor, the shopping cart is discharged from the inclined conveyor and can be retrieved by the shopper.

The inclined shopping cart conveyor of the present invention preferably includes an infrared or heat sensor mounted above the loading end of the inclined conveyor. The infrared sensor is positioned to detect whether a person has passed beneath an entry arch positioned at the loading end of the conveyor. The infrared sensor is coupled to a control unit that terminates the movement of the conveyor belt upon detection of a person. In this manner, the control unit of the inclined conveyor prevents operation of the conveyor when a person is too close to the moving conveyor belt.

The inclined conveyor further includes a pair of spaced photoelectric sensors positioned near both the loading end and the unloading end of the inclined conveyor. The photoelectric sensors are each coupled to the control unit of the inclined conveyor. The photoelectric sensors are spaced from each other by a large enough distance such that a shopping cart does not simultaneously break the through beams generated by a pair of spaced sensors. Thus, during normal operation when only a shopping cart is being loaded onto the inclined conveyor, the photoelectric sensors will permit continued operation of the inclined conveyor. However, if both photoelectric sensors are tripped at the same time, the control unit will interrupt operation of the inclined conveyor. Again, the photoelectric sensors prevent operation of the inclined conveyor when a person is present at either the loading end or the unloading end of the inclined conveyor.

The inclined conveyor of the present invention includes a jam detector that senses when one of the shopping carts is jammed along the length of the inclined conveyor. In the preferred embodiment of the invention, the jam detector includes a pair of metallic conductor strips that extend along the length of the inclined conveyor and are positioned slightly above the moving conveyor belt. One of the metallic conductor strips receives an electric charge and both of the conductor strips are connected to the control unit of the inclined conveyor. When a jam occurs along the length of the inclined conveyor, a metallic cross bar attached to the front end of the cart completes an electrical connection between the spaced metallic conductor strips. The contact between the shopping cart and the metallic conductor strips is sensed by the control unit. Upon sensing a jam, the control unit initially terminates operation of the drive motor that is moving the conveyor belt. Preferably, the control unit then reverses the direction of operation of the drive motor in an attempt to clear the jam along a length of the inclined conveyor. If the jam is cleared, the conveyor resumes normal operation. However, if the jam is not cleared, the control unit suspends operation and must be manually reset.

The upwardly moving inclined conveyor includes a plurality of cart arresters positioned along the length of the conveyor. Each of the cart arresters is operable to prevent the uninhibited downward movement of a shopping cart should the shopping cart become disengaged from the conveyor belt. Each of the cart arresters includes a spring-biased stopping arm that allows the cart to move freely in the upward direction, while preventing the uninhibited movement in the downward direction.

The downwardly moving inclined conveyor also includes a plurality of spaced cart arresters. In the downwardly moving conveyor, each of the cart arresters includes a stopping arm that extends into the path of travel of the shopping cart. Upon detecting a cart moving at the proper speed, the control unit of the inclined conveyor retracts a solenoid to pull the stopping arm inward and out of the path of the shopping cart. However, if the control unit does not activate the solenoid, the stopping arm prevents the downward movement of the shopping cart. Thus, the control unit must positively activate the solenoid in order to allow the shopping cart to move past the cart arrester.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a side schematic illustration of an upwardly moving inclined shopping cart conveyor used to move a shopping cart between a lower floor and an upper floor;

FIG. 2 is a side schematic illustration of a downwardly moving inclined shopping cart conveyor used to move a shopping cart from an upper floor to a lower floor;

FIG. 7 is a section view taken along line 7—7 of FIG. 6 illustrating the engagement between the shopping cart and the conveyor belt;

FIG. 14 is a section view taken along line 14—14 of FIG. 11 illustrating the interaction between the shopping cart and the conveyor belt;

FIG. 16 is an illustration of the movement of the shopping cart occurring during a jamming of the shopping cart conveyor;

FIG. 17 is a section view taken along line 17—17 of FIG. 16 further illustrating the movement of the shopping cart during jamming of the shopping cart conveyor;

FIG. 18 is a partial perspective view illustrating an alternate configuration for the front end of the shopping cart used with the inclined shopping cart conveyor of the present invention;

FIG. 19 is a perspective view illustrating a first alternate embodiment of the conveyor assembly for the inclined shopping cart conveyor;

FIG. 20 is a second alternate embodiment of the conveyor assembly for the inclined shopping cart conveyor;

DETAILED DESCRIPTION OF THE INVENTION

Figure 3:
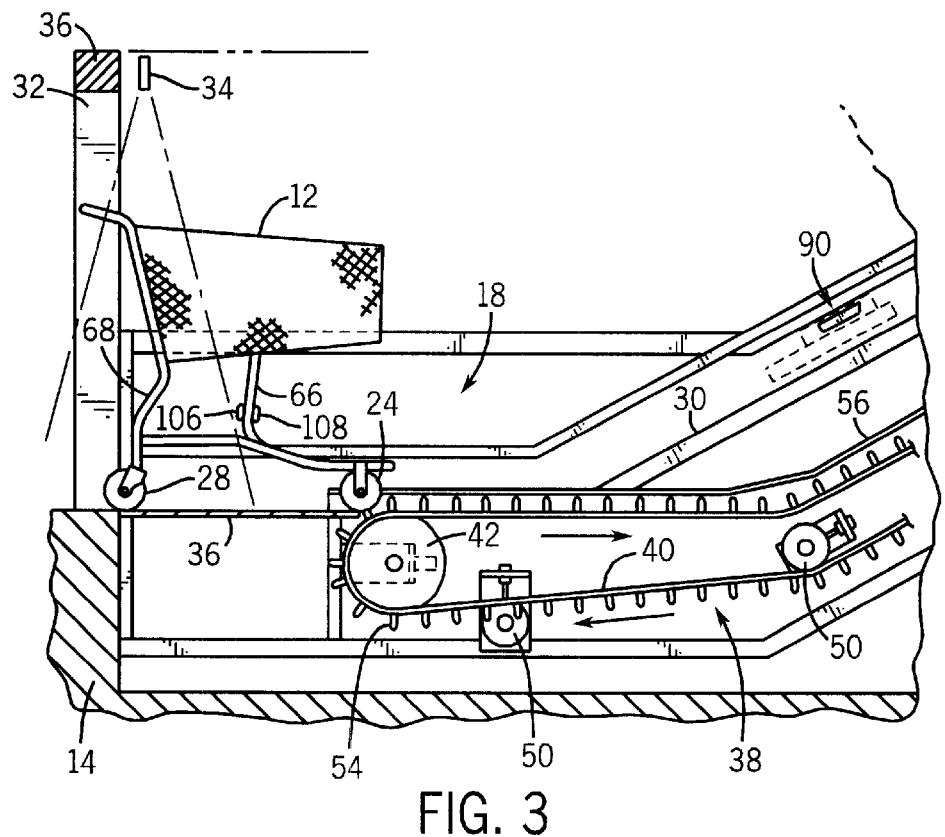
FIG. 3 is a partial side view illustrating the engagement of a shopping cart by the inclined shopping cart conveyor of FIG. 1.

Referring first to FIGS. 1 and 2, thereshown is an upwardly moving inclined conveyor 10a (FIG. 1) and a downwardly moving inclined conveyor 10b (FIG. 2) for moving shopping carts 12 between a lower floor 14 and an upper floor 16. The inclined conveyors 10a and 10b of the present invention are similar in construction and are each particularly useful in a multi-floor department store having escalators for moving shoppers between the lower floor 14 and the upper floor 16. In the preferred embodiment of the invention as illustrated, the angle of both the upwardly moving and downwardly moving inclined conveyors 10a and 10b is the same as a conventional people-moving escalator. Preferably, the inclined conveyors are sloped at an angle of 30% Thus, the inclined conveyors 10 of the present invention are able to move a series of shopping carts between the upper and lower floors and can be positioned adjacent to a conventional escalators.

As can be understood in FIGS. 1 and 2, the inclined conveyors 10a and 10b include two distinct, yet related constructions for moving the shopping carts upwardly and downwardly between the two floors 14 and 16. Although the upwardly and downwardly moving conveyors 10a and 10b are both referred to in the following description as inclined conveyors 10, it will become apparent in the foregoing discussion that although the conveyors are essentially the same, small differences exist due to the direction of travel of the shopping carts 12.

Referring now to FIG. 1, the upwardly moving inclined conveyor 10a extends between a loading end 18 and an unloading end 20. Shopping carts 12 are positioned on the inclined conveyor 10 at the loading end 18 where a continuous conveyor 22 engages each shopping cart 12 and pulls the shopping cart 12 upward along the inclined conveyor 10 until it leaves contact with the continuous conveyor 20 at the unloading end 20.

While the shopping cart 12 is traveling upward from the lower floor 14 to the upper floor 16, the front wheels 24 of the shopping cart 12 are supported along a pair of spaced, front wheel tracks 26. At the same time, the rear wheels 28 ride along a pair of rear wheel tracks 30. As can be understood in FIG. 1, the front wheel tracks 26 and the rear wheel tracks 30 are vertically spaced from each other such that the shopping cart 12 maintains a generally horizontal position as it travels upward along the upwardly moving inclined conveyor 10a.

Referring now to FIG. 2, the downwardly moving inclined conveyor 10b also extends between a loading end 18 and an unloading end 20. As can be seen in FIG. 2, the front wheels 24 of each shopping cart 12 ride along a pair of spaced front wheel tracks 26 while the rear wheels 28 ride along a pair of rear wheel tracks 30. As can be understood in the comparison of FIGS. 1 and 2, in the downwardly moving inclined conveyor 10b of FIG. 2, the rear wheel tracks 30 are positioned vertically below the front wheel tracks 26 in order to maintain the shopping cart in a generally horizontal orientation.

As can be seen in FIGS. 1 and 2, both the loading end 18 and the unloading end 20 of the inclined conveyor 10 include an entry arch 32 through which the shopping cart 12 must pass. The significance of the entry arches 32 will be discussed below.

Referring now to FIG. 3, thereshown is the loading end 18 of the upwardly moving inclined conveyor 10a. The loading end of the inclined conveyor includes the entry arch 32 through which the shopping cart 12 must pass before reaching the conveyor assembly. As the shopping cart passes through the entry arch 32, the shopping cart 12 passes beneath a sensor 34 mounted to the cross beam 36 of the entry arch. In the preferred embodiment of the invention, the sensor 34 is an infrared or heat detecting sensor that can be used to determine whether a person or child is riding within the shopping cart 12 or has passed through the arch 32. If the sensor 34 detects a level of heat above a predetermined level, which indicates the presence of a person, the sensor 34 sends a signal to a control unit (not shown) of the inclined conveyor, which in turn shuts down operation of the inclined conveyor. The sensor 34 is thus able to prevent a person or child from riding up the inclined conveyor within the shopping cart 12.

After the shopping cart 12 passes through the entry arch 32 and beneath the sensor 34, the shopping cart passes over a stationary platform 36 and comes into contact with the continuous conveyor assembly 38. The conveyor assembly 38 provides the driving force to move each of the shopping carts 12 from the lower floor 14 to the upper floor 16.

Figure 4:
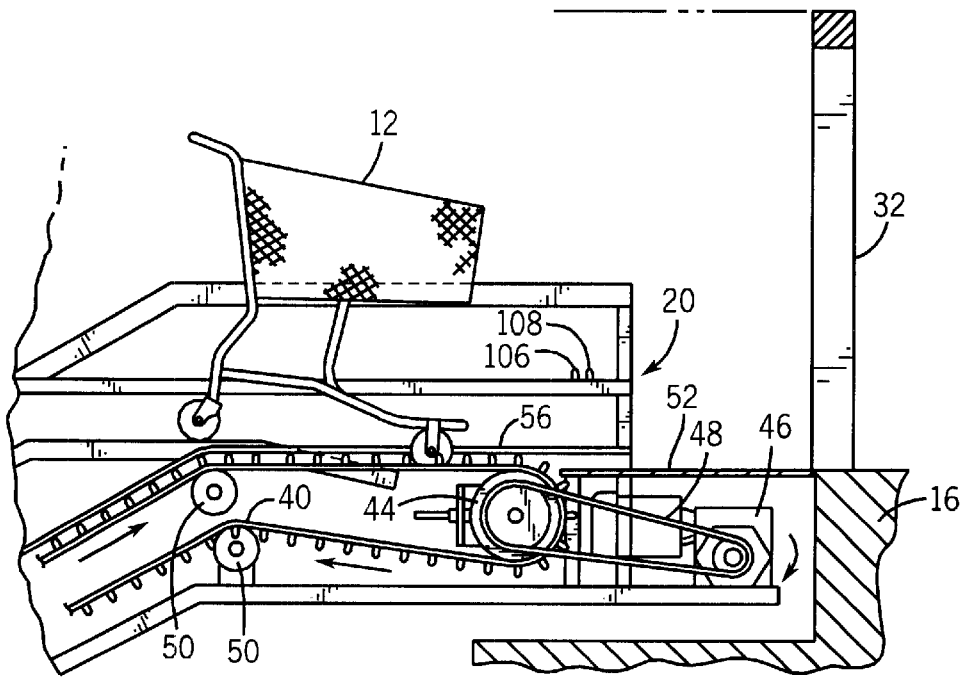
FIG. 4 is a partial side view illustrating the discharge of the shopping cart from the inclined shopping cart conveyor.

The continuous conveyor assembly 38 includes a continuous conveyor belt 40 that is entrained between an idler roller 42 and a driven roller 44, as shown in FIG. 4. The driven roller 44 is connected to a drive motor 46 by a drive belt 48. Rotation of the drive motor 46 is controlled by a main control unit (not shown) for the inclined conveyor 10. Preferably, the drive motor 46 is operated at a continuous speed such that the drive belt 48 causes the conveyor belt 40 to move at a constant, desired speed. As illustrated in FIGS. 3 and 4, the conveyor belt is supported by a plurality of idler rolls 50 and a slider bed (not shown) to help eliminate sagging in the conveyor belt 40 over its continuous path between the idler roller 42 and the driven roller 44.

Referring back to FIG. 3, once the shopping cart 12 is engaged by the conveyor belt 44, the front wheels 24 of the shopping cart ride along the front wheel tracks 26 while the rear wheels 28 ride along the rear wheel tracks 30. The shopping cart continues to ride along the continuous front wheel tracks 26 and rear wheel tracks 30 until it reaches the unloading end 20, as illustrated in FIG. 4. As can be seen in FIG. 4, conveyor belt 40 travels around the driven roller 44 such that the shopping cart 12 leaves contact with the conveyor belt 40 and is received upon a discharge platform 52.

Referring now to FIG. 7, the conveyor belt 40 is formed including a series of spaced drive lugs 54 extending from the otherwise flat conveyor belt 40. The drive lugs 54 are spaced approximately four inches from each other and are formed integrally with the remaining portions of the conveyor belt 40 and are preferably formed from a durable rubber material.

Figure 8:
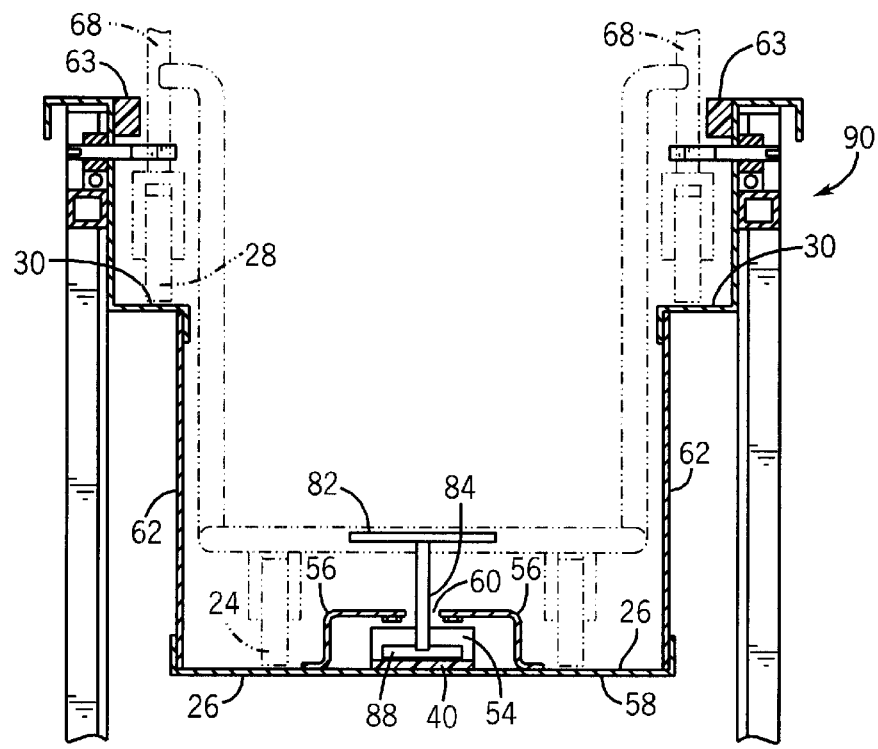
FIG. 8 is a section view taken along line 8—8 of FIG. 6 illustrating the construction of the upwardly moving inclined shopping cart conveyor.

Referring now to FIG. 8, the conveyor belt 40, including the series of spaced drive lugs 54, is substantially enclosed by a pair of cover plates 56 that are mounted to a base plate 58 of the inclined conveyor 10. The cover plates 56 prevent a shopper or child from contacting the moving conveyor belt 40 when the inclined conveyor 10 is in operation. As shown in FIGS. 3 and 4, the cover plates 56 extend past both the idler roller 42 and the driven roller 44 to prevent contact with the moving conveyor belt 40 at both the loading end 18 and the unloading end 20.

As can be seen in FIG. 8, the cover plates 56 define an open guide slot 60 that extends along the entire length of the inclined conveyor. The open guide slot 60 receives a portion of the shopping cart 12, as will be described below, to both guide the shopping cart and provide the required force to move the shopping cart along the inclined conveyor.

The base plate 58 defines the pair of front wheel tracks 26 which are each formed between one of the cover plates 56 and a sidewall 62. The sidewall 62 supports the rear wheel track 30, which is positioned above the front wheel tracks 26, as illustrated in FIG. 8. A pair of bumpers 63 formed from nylon are positioned along the length of the inclined conveyor to help guide the shopping cart along the length of the conveyor.

Figure 5:
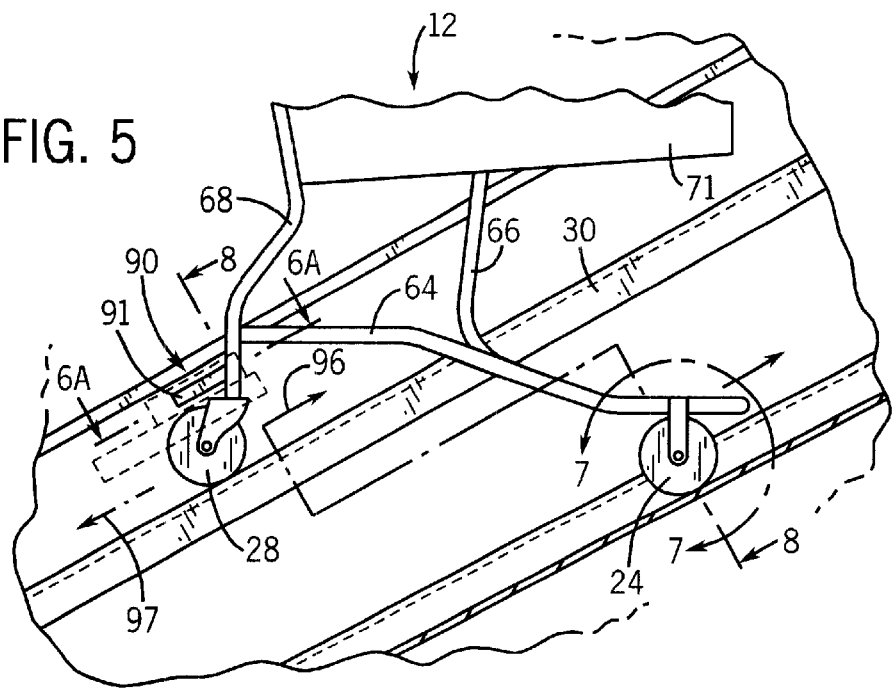
FIG. 5 is a side view illustrating the movement of a shopping cart past one of the cart arresters positioned along the length of the inclined conveyor.

Referring now to FIG. 5, the shopping cart 12 includes a pair of side rails 64 that support the pair of front wheels 24 and rear wheels 28. The side rails 64 are joined to a front upright 66 and a back upright 68 that, in turn, support the basket 71 of the shopping cart 12 above the wheels. As can be seen in FIG. 7, the pair of side rails 64 are joined to each other by a front cross bar 70. The front cross bar 70 is a tubular member that extends across the lateral width of the shopping cart to provide stability for the pair of side rails 64.

Referring now to FIG. 17, the shopping cart 12 includes a mounting plate 72 that extends between and is connected to the pair of spaced side rails 64. The mounting plate 72 is preferably welded between the pair of side rails 64. As can be seen in FIG. 17, the mounting plate 72 provides support for each of the front wheels 24. Specifically, each of the front wheels 24 includes a pivot shaft 76 that extends through the mounting plate 74 and is secured by a nut 78.

In addition to supporting the pair of front wheels 24, the mounting plate 72 is used to support an engagement bracket 80 that extends beneath the shopping cart 12 as shown in FIG. 17. The engagement bracket 80 includes a horizontal attachment plate 82 and a vertical support bar 84. The vertical support bar 84 is preferably welded to the attachment plate 82 and is strengthened by an angular reinforcement plate 86, as best shown in FIG. 7. Referring back to FIG. 17, the lower end of the support bar 84 includes a cross bar 88 that extends in a generally horizontal direction. As illustrated in FIGS. 7 and 17, the horizontal cross bar 88 is positioned slightly above the lowermost portion of each front wheel 24 such that the cross bar 88 does not contact the ground when the cart is in normal use.

Referring back to FIG. 7, the cross bar 88 and the lowermost portion of the support bar 84 are engaged by the drive lug 54 such that the conveyor belt 40 can move the shopping cart 12 along the length of the inclined conveyor 10.

Referring now to FIG. 8, the vertical support bar 84 is sized to fit within the guide slot 60 defined by the pair of spaced cover plates 56. The cross bar 88 has a length greater than the width of the guide slot 60 such that the pair of cover plates 56 retain the cross bar 88 therebeneath. In this manner, the pair of cover plates 56 prevent the shopping cart 12 from being removed from the inclined conveyor while the shopping cart is being transported between the lower floor 14 and the upper floor 16.

In the preferred embodiment of the invention, the entire engagement bracket 80 is formed from a metallic material to provide the required durability and strength to allow the conveyor belt 40 to pull the shopping cart up the inclined conveyor.

Figure 6A:
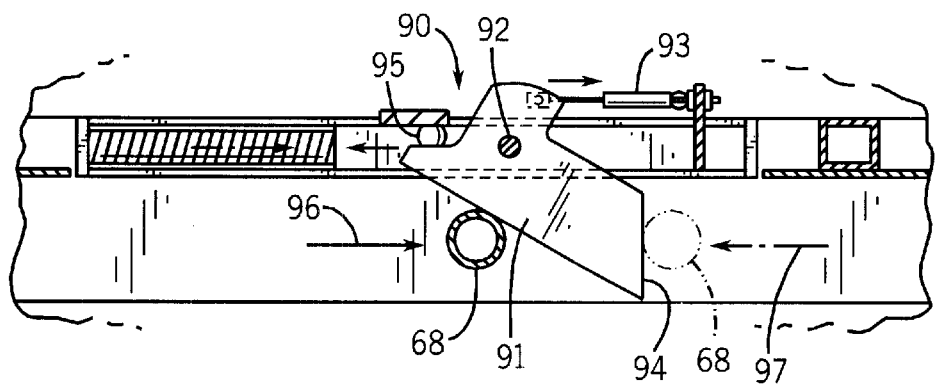
FIG. 6a is a top view illustrating the movement of the back upright of a shopping cart in both the upward and downward direction relative to the cart arrester.

Referring now to FIG. 5, thereshown is the operation of one of a plurality of cart arresters 90 that are spaced along the length of the rear wheel track 30. As illustrated in FIG. 6a, the cart arrester 90 includes a stopping arm 91 that is pivotable about a center point 92. During normal conditions, the stopping arm 91 is biased by a spring 93 such that its stopping surface 94 extends into the path of the back upright 68 of the shopping cart. The pivoting movement of the stopping arm 91 is limited by a fixed stopper 95, as illustrated in FIG. 6a.

As shown in FIG. 5, the shopping cart 12 is normally engaged by the upwardly moving inclined conveyor and is preferably moving in the desired direction, as indicated by arrow 96. However, should the shopping cart 12 become disengaged from the continuous conveyor assembly, the force of gravity will cause the shopping cart to move in an uninhibited manner in the direction illustrated by the arrow 97. This unintentional movement of the shopping cart in the undesired direction will be stopped by the interaction between the back uprights 68 and the cart arrester 90. Specifically, the back uprights 68 will contact the stopping surface 94, as shown in FIG. 6a. The stopper 95 prevents further rotation of the stopping arm 91, which halts further movement of the shopping cart 12 in the direction of arrow 97.

Figure 6B:
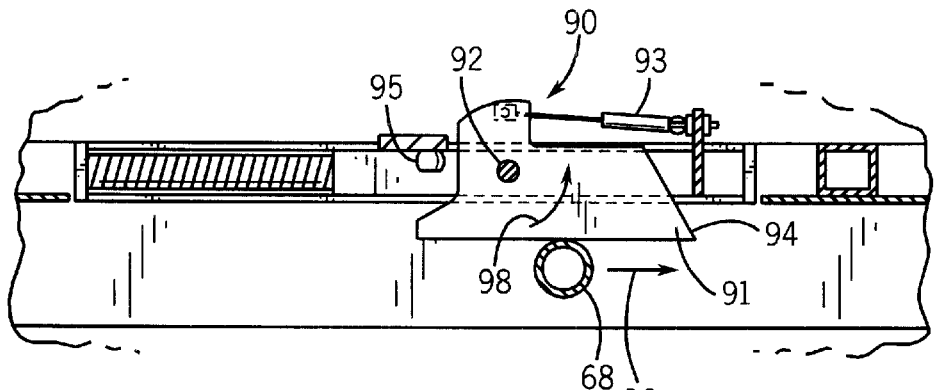
FIG. 6b is a top view illustrating the movement of the stopping arm of the cart arrester to permit passage of the back upright past the cart arrester.

During the normal upward movement of the shopping cart 12 along the inclined conveyor, the movement of the shopping cart 12 causes the stopping arm 91 to overcome the spring bias and pivot in the direction illustrated by arrow 98 in FIG. 6b such that the shopping cart 28 can pass the stopping arm 91. As can be understood in FIGS. 6a and 6b, the cart arrester 90 for the upwardly moving inclined conveyor allows the shopping cart to move freely in the desired direction, while preventing unintentional movement of the shopping cart in the undesired direction.

Referring back to FIGS. 3 and 4, the inclined conveyor 10 of the present invention includes a pair of sensors 106 and 108 positioned near the loading end 18 of the inclined conveyor. The pair of sensors 106, 108 are preferably either through beam or photoelectric sensors that detect the presence of an object in front of the sensor. The sensors 106, 108 are connected to the control unit (not shown) for the inclined conveyor such that the control unit can determine whether an object is present in front of the sensors 106 and 108. Based on the detection of an object or person in front of the sensors 106, 108, the control unit for the inclined conveyor can suspend operation of the drive motor to prevent further movement of shopping carts along the inclined conveyor. This feature is important to prevent persons stepping onto the inclined conveyor 10.

In the preferred embodiment of the invention, the sensors 106, 108 are positioned approximately two inches apart such that the front uprights 66 and the back uprights 68 of the shopping cart 12 can pass between the sensors 106, 108 without simultaneously activating both sensors. The control unit of the inclined conveyor 10 is programmed to suspend operation of the drive motor whenever both of the sensors 106, 108 are tripped at the same time. Thus, the sensors 106, 108 prevent operation of the drive motor whenever an object having a width of greater than two inches passes in front of the sensors, since an object this large will trip both sensors simultaneously. Preferably, the control unit of the inclined conveyor is programmed such that the control unit will allow further operation of the inclined conveyor only when the sensor 106 is tripped prior to sensor 108. This sequence indicates proper movement of the shopping cart at the infeed end 18. If sensor 108 is tripped prior to sensor 106, this indicates improper movement of the cart, which will result in disruption of operation of the inclined conveyor.

Referring now to FIG. 4, thereshown are a corresponding pair of sensors 106 and 108 positioned at the unloading end 20 of the upwardly moving inclined conveyor 10a. The sensors 106 and 108 positioned at the unloading end 20 of the inclined conveyor function in the identical manner to the same type of sensors 106 and 108 positioned at the loading end 18 of the upwardly moving inclined conveyor.

Figure 9:
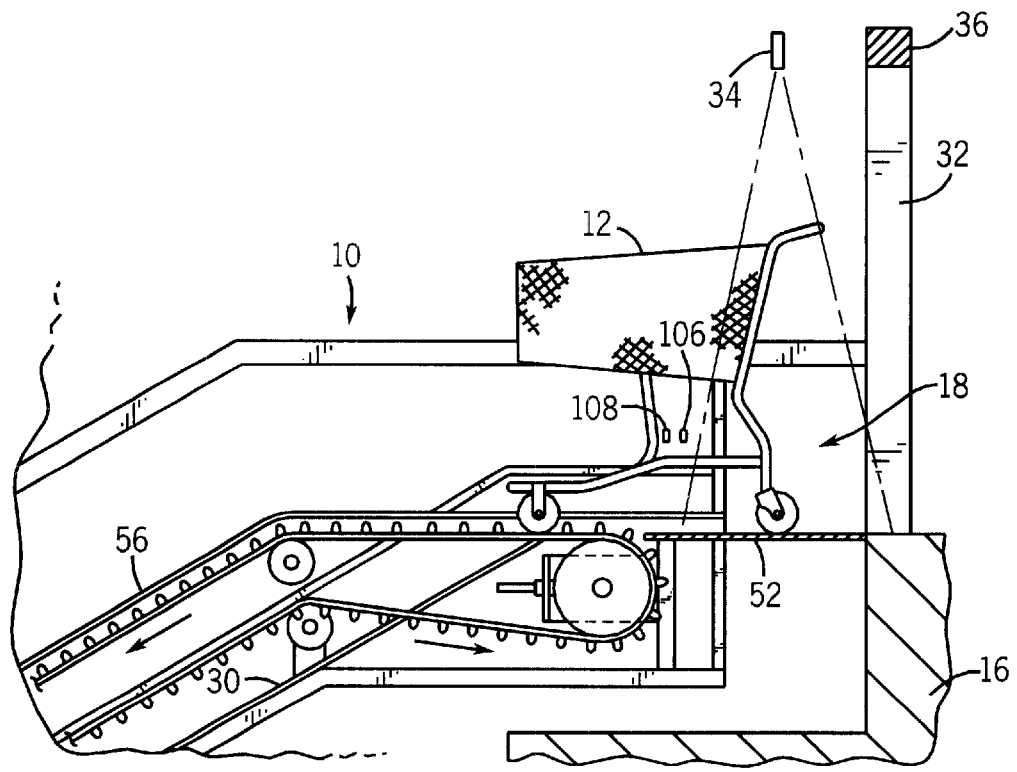
FIG. 9 is a partial side view illustrating the engagement of a shopping cart by the inclined shopping cart conveyor of FIG. 2.
Figure 10:
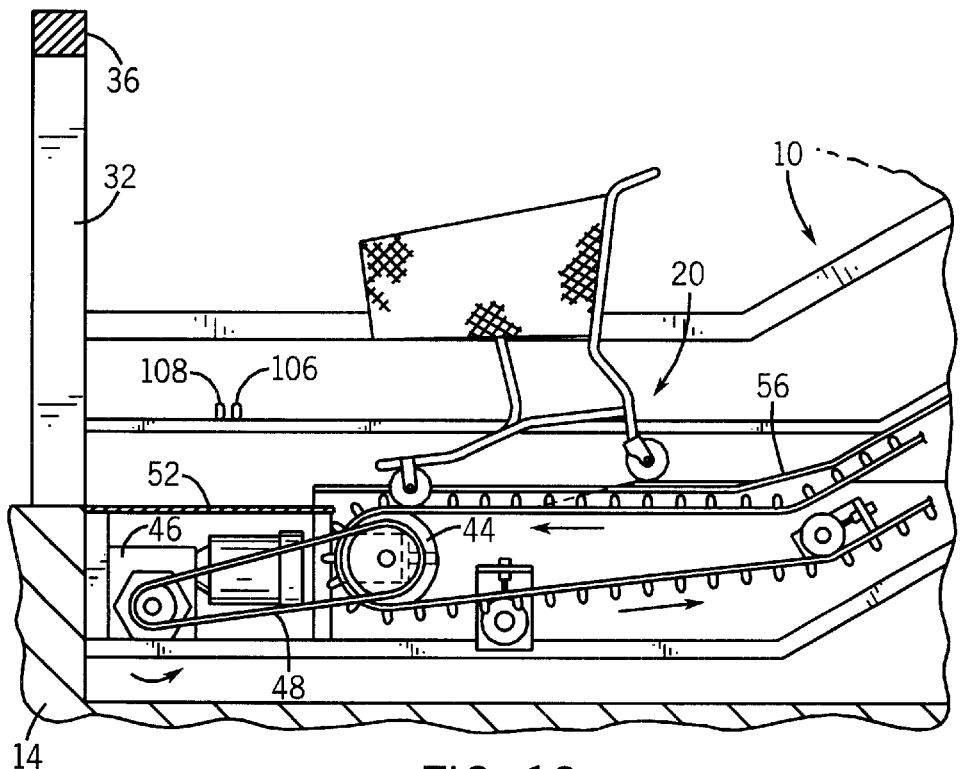
FIG. 10 is a side view illustrating the discharge of the shopping cart from the inclined shopping cart conveyor.

Referring now to FIGS. 9 and 10, thereshown are the loading end 18 (FIG. 9) and unloading end 20 (FIG. 10) of the downwardly moving inclined conveyor 10b. The components and operation of the downwardly moving inclined conveyor 10b are similar to those included in the upwardly moving inclined conveyor 10a previously discussed and like reference numerals will be used to facilitate understanding. As can be understood in FIGS. 9 and 10, the loading end 18 is contained on the upper floor 16, while the unloading end 20 is contained on the lower floor 14.

As can be seen in FIGS. 9 and 10, the unloading end 20 includes a pair of photoelectric sensors 106 and 108. As was the case with the upwardly moving conveyor shown and described in FIGS. 3 and 4, the photoelectric sensors 106, 108 suspend operation of the moving conveyor if both sensors 106, 108 are simultaneously blocked or if the sensors are tripped in the wrong order. The sensors 106, 108 are positioned to prevent a shopper or child from entering onto the moving inclined conveyor 10.

Figure 11:
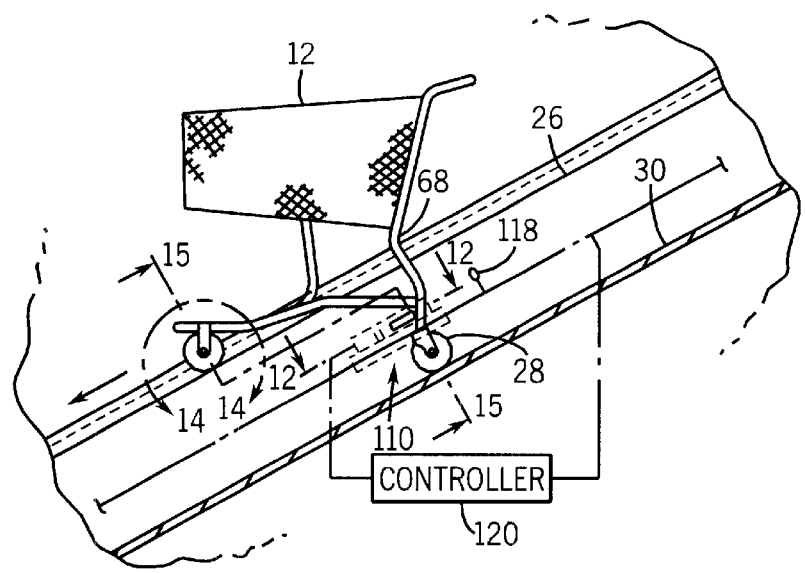
FIG. 11 is a side view illustrating the position of a cart arrester along the downwardly moving inclined shopping cart conveyor.

Referring now to FIG. 11, when the shopping cart 12 is being transported by the downwardly moving inclined conveyor between the upper floor and the lower floor, the rear wheels 28 travel along the rear wheel tracks 30. As shown in FIG. 11, a plurality of spaced cart arresters 110 are positioned above the rear wheel tracks 30. The cart arresters 110 are similar to the cart arresters 90 used on the upwardly moving conveyor previously discussed.

Figure 12:
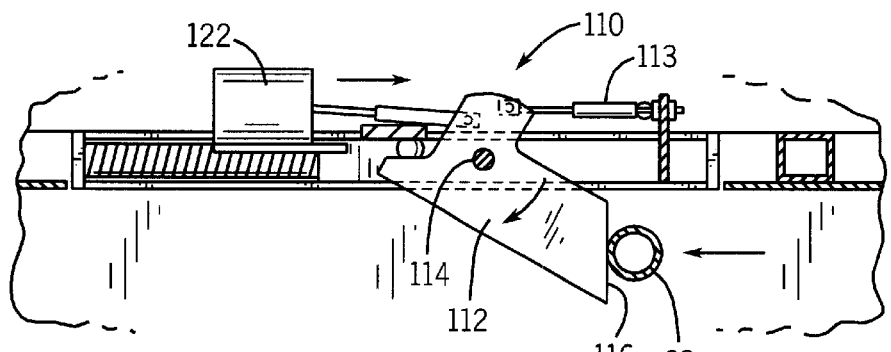
FIG. 12 is a magnified top view illustrating the operation of the cart arrester to prevent uncontrolled descent of the shopping cart along the shopping cart conveyor.

As shown in FIG. 12, the cart arrester 110 includes a stopping arm 112 that is mounted about a pivot point 114. In the normal condition, the stopping arm 112 is biased by spring 113 such that the stopping end 116 extends into the path of the shopping cart as the shopping cart moves downward along the conveyor. Thus, as can be understood in FIGS. 11 and 12, during normal conditions the shopping cart 12 is unable to pass the cart arrester 110. This configuration is specifically designed into the system to ensure that the cart arrester 110 has a fail-safe mode of operation.

Figure 13:
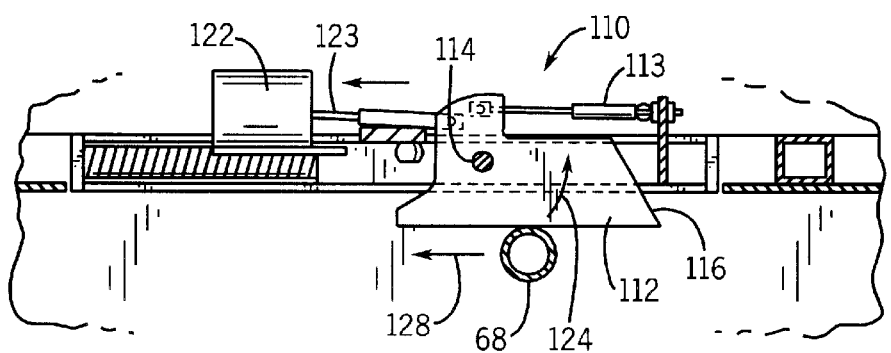
FIG. 13 is a magnified top view illustrating the movement of the shopping cart past the cart arrester.

As illustrated in FIG. 11, the inclined conveyor includes a photoelectric sensor 118 spaced slightly above each of the cart arresters 110 and coupled to a controller 120 for the entire inclined conveyor. The controller 120 receives signals from the photoelectric sensors 118 to indicate the amount of time the shopping cart 12 was in front of the sensor 118. Based on the sensed speed of the shopping cart, the controller 120 selectively activates a solenoid 122, which retracts the plunger 123 to pull the stopping arm 112 in the direction illustrated by arrow 124 in FIG. 13. In its retracted position of FIG. 13, the stopping arm 112 is flush with the side rails of the conveyor such that the shopping cart can pass the cart arrester 110 and continue moving in the direction illustrated by arrow 128.

However, if the sensor 118 detect that the shopping cart is moving too quickly or in an uncontrolled manner, the controller 120 does not activate the solenoid 122 and the solenoid 122 remains in its extended position such that the rear uprights 68 of the shopping cart 12 contacts the stop surface 116 of the stopping arm 112 to prevent further movement of the cart along the inclined conveyor, as illustrated in FIG. 12. As discussed previously, this fail-safe mode of operation prevents uncontrolled descent of the shopping cart along the length of the inclined conveyor should a failure occur in the controller 120.

Referring now to FIG. 14, thereshown is the interaction between the drive lugs 54 of the downwardly moving conveyor belt 40 and the cross bar 88 contained on the engagement bracket 80 mounted near the front of the shopping cart. As can be seen in FIG. 14, the cross bar 88 rides along the trailing edge surface 120 of the drive lug 54 to slow the movement of the cart along the inclined conveyor due to the force of gravity. Unlike the first embodiment in which the conveyor belt 40 pulls the shopping cart upward along the length of the conveyor, the conveyor belt 40 in the downwardly moving inclined conveyor restricts the movement of the shopping cart due to the forces of gravity.

Figure 15:
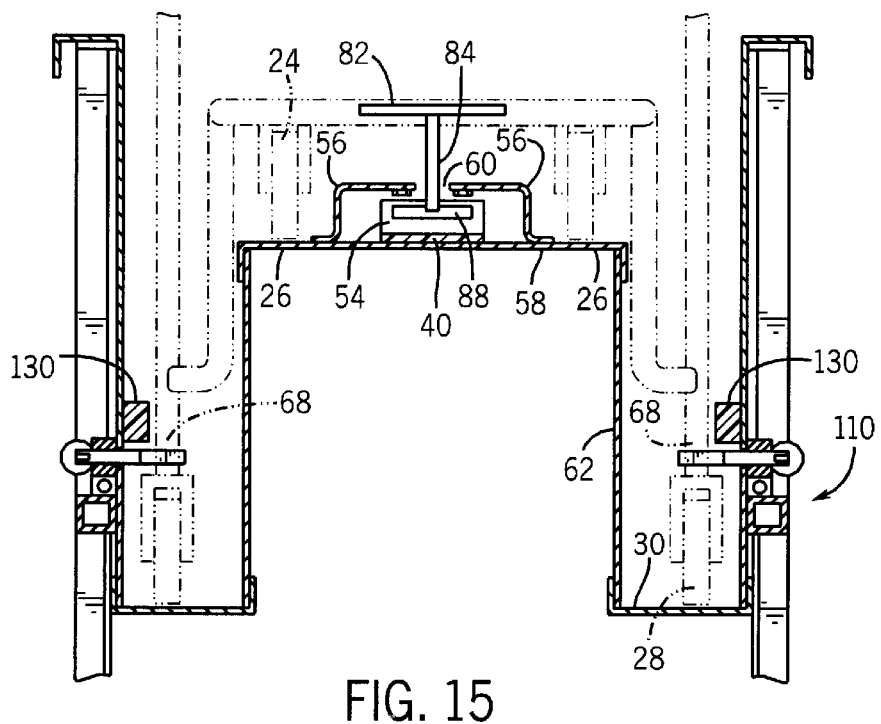
FIG. 15 is a section view taken along line 15—15 of FIG. 11 illustrating the construction of the downwardly moving inclined shopping cart conveyor.

Referring now to FIG. 15, it can be seen that the front wheel tracks 26 are positioned vertically above the rear wheel tracks 30 in the downwardly moving inclined conveyor 10b. Again, the staggered positioning of the front wheel tracks 26 relative to the rear wheel tracks 30 allows the shopping cart 12 to maintain a generally constant, horizontal orientation to prevent spilling of the contents of the shopping cart. As was the case in the upwardly moving inclined conveyor of FIG. 8, the downwardly moving inclined conveyor includes a pair of guide rails 130 that contact the back uprights 68 of the shopping cart to aid in guiding the shopping cart along the inclined conveyor. In the preferred embodiment of the invention, the guide rails 130 are formed from nylon to provide a durable rail that does not mark up the shopping cart 12.

When developing the inclined conveyor of the present invention, a need was identified for a system to prevent continued operation of the conveyor assembly when one of the shopping carts becomes jammed along the length of the inclined conveyor. In typical conveyor systems, a torque-sensing element is mounted to the drive motor and stops operation of the drive motor when the torque being applied by the motor exceeds a predetermined limit. The increase in torque on the drive motor is typically a result of a jammed conveyor belt resulting from the inability of the conveyor to keep moving due to a jammed article.

In the present invention, however, the continuous conveyor assembly, including the conveyor belt 40 and the drive motor 46, is used to move vastly varying loads along the length of the inclined conveyor. For example, during slow shopping periods at a department store, the inclined conveyor may only be moving one or two carts at a time. Additionally, these carts may be empty or nearly empty, such that the load seen by the drive motor is very small. Alternatively, during periods of heavy consumer traffic, such as during the holiday season, the drive motor may be moving many more carts simultaneously that are fully loaded with merchandise. Thus, during this period of normal operation, the torque generated by the motor would be significantly higher than in the unloaded condition. Therefore, the use of a torque sensor associated with the drive motor was determined to be a non-preferred embodiment of the invention.

Referring now to FIGS. 16 and 17, thereshown is the jam detector utilized in the present invention. The jam detector of the present invention is used to determine when one of the shopping carts has become jammed along the length of the inclined conveyor and performs a clearing function in order to try to eliminate the jam. As shown in FIGS. 16 and 17, the jam detector includes a pair of metallic conductor strips 132 mounted along a top, inner surface 133 of each cover member 56. Specifically, each of the conductor strips 132 are contained on the inner surface 133 of the top wall 134 of each cover plate and are positioned above the drive lugs 54 of the conveyor belt 40. More specifically, each of the conductor strips 132 are positioned above the extended ends of the cross bar 88 of the engagement bracket 80 when the shopping cart is being moved by the inclined conveyor 10.

The conductor strips 132 extend along the entire length of the cover plates 56 from the loading end to the unloading end of the inclined conveyor. In the preferred embodiment of the invention, one of the conductor strips 132 is connected to a supply of electricity such that the strip is electrified. Additionally, each of the electrified conductor strips 132 is connected to the control unit for the inclined conveyor.

When the shopping cart 12 becomes jammed along the length of the inclined conveyor, whether the conveyor is upwardly moving or downwardly moving, the driven conveyor belt 40 attempts to continue moving. Since the drive lugs 54 are formed from a generally resilient material, the drive lugs 54 cause the cross bar 88 to ride upward along its leading edge 135, as illustrated by arrow 136 in FIG. 16. The upward movement of the cross bar 88 along the leading edge 135 results in the cross bar 88 contacting each of the conductor strips 132, as best illustrated in FIG. 17.

When the cross bar 88 contacts the conductive strips 132, the cross bar 88 completes an electrical connection between the strips 132 which is detected by the controller 120. Based upon this connection between the conductor strips 132, the controller temporarily stops operation of the drive motor and thus movement of the conveyor belt 40. In the preferred embodiment of the invention, the control unit then reverses the direction of operation of the drive motor in an attempt to clear the jam along the inclined conveyor. After momentarily reversing direction of the drive motor, the control unit begins operation of the drive motor in its desired direction. If the control unit again detects a jam through the connection between the conductor strips, the control unit will shut down operation of the inclined conveyor until service personnel can clear the jam along the length of the conveyor.

Referring now to FIG. 18, thereshown is an alternate embodiment of the shopping cart of the present invention. In the embodiment illustrated in FIG. 18, the engagement bracket 80, including the cross bar 88, is mounted directly to the front cross bar 70 that extends between the pair of side rails 64 of a conventional shopping cart. In this embodiment, each of the front wheels 24 is mounted directly to the frame of the shopping cart instead of to a mounting plate, as illustrated in the previous embodiment of the invention. An advantage of the embodiment illustrated in FIG. 18 is that the engagement bracket 80 can be mounted directly to existing shopping carts without the inclusion of the additional components illustrated in the prior embodiment.

Referring now to FIG. 19, thereshown is an alternate embodiment for the continuous conveyor assembly used to move the shopping cart. In the continuous conveyor assembly 138 illustrated in FIG. 19, the conveyor assembly includes an idler sprocket wheel 140 that receives a drive chain 142. The drive chain 142 replaces the conveyor belt previously discussed and includes a series of spaced, outwardly extending brackets 144 that are mounted to the links of the drive chain 142. As illustrated in FIG. 19, the brackets 144 contact the cross bar 88 to pull the shopping cart 12 up the inclined conveyor or restrict its movement due to gravity along a downwardly moving conveyor.

Referring now to FIG. 20, thereshown is an additional alternate embodiment of the conveyor assembly used to move the shopping cart 12. In the embodiment of the invention illustrated in FIG. 20, the conveyor assembly includes an idler pulley 146 around which is entrained a driven cable 148. The cable 148 includes a series of spaced T-bars 150 each having an outwardly extending flange 152. The flange 152 contacts and engages the cross bar 88 attached to the front cross bar of the shopping cart 12.

Figure 21:
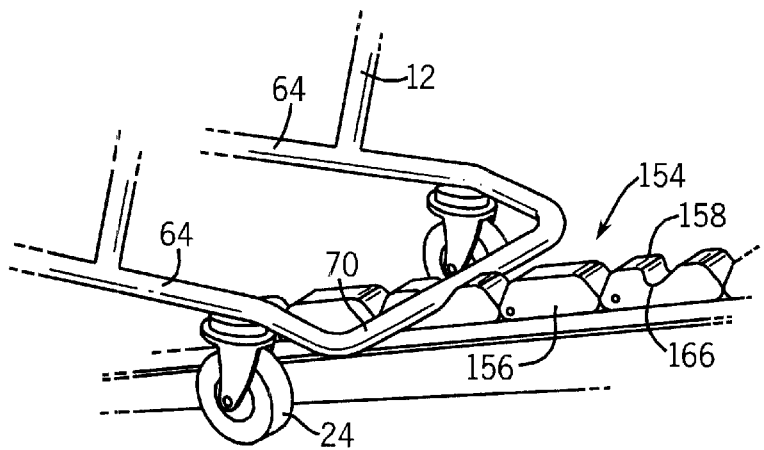
FIG. 21 illustrates an alternate form of engagement between the front end of the shopping cart and the conveyor assembly of the shopping cart conveyor.
Figure 22:
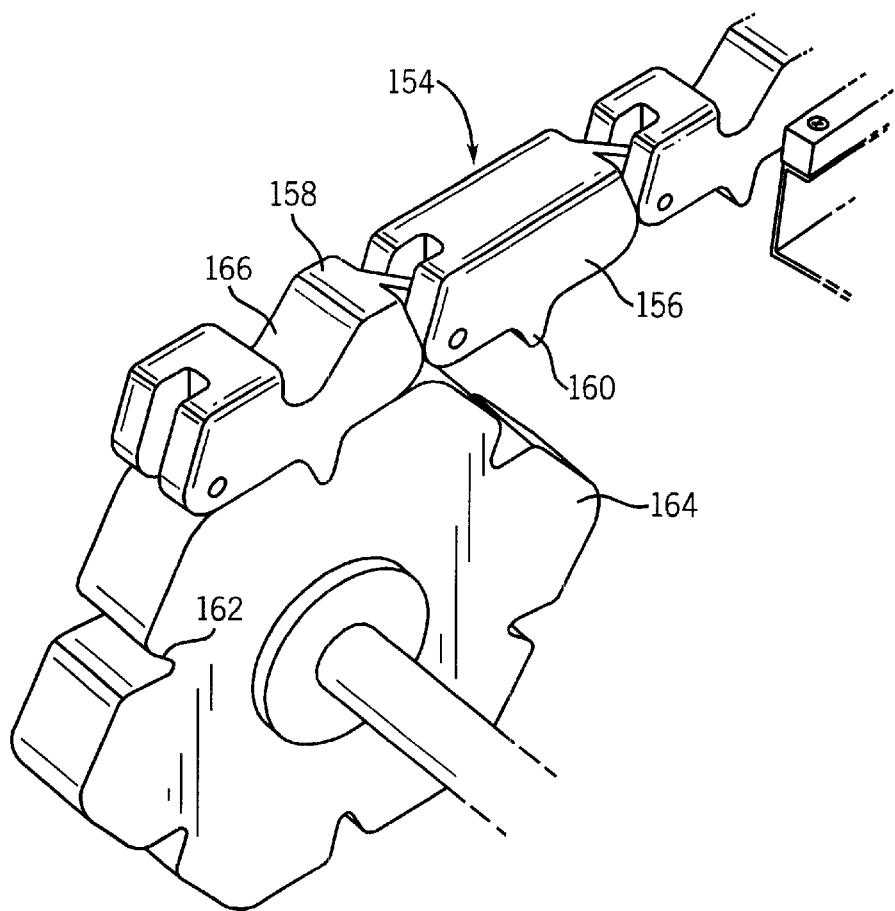
FIG. 22 is a magnified view illustrating the drive chain and sprocket wheel of an alternate embodiment of the invention.

Referring now to FIG. 21, thereshown is another alternate embodiment of the conveyor assembly and method of engagement between the conveyor assembly and the shopping cart 12. In the embodiment of FIG. 22, the conveyor assembly includes a drive chain 154 that is formed from alternating spacer links 156 and pickup links 158. Both the spacer links 156 and the pickup links 158 are formed from molded rubber or recycled plastic. Each of the links includes an inwardly extending tab 160 that is received by a corresponding groove 162 formed in the idler sprocket 164. In this manner, the drive chain 154 is able to pass around the idler sprocket 164.

As can be seen in FIG. 22, each of the pickup links 158 includes a recessed notch 166 that is sized to receive the front cross bar 70 of the shopping cart, as illustrated in FIG. 21. As illustrated in FIG. 21, the front cross bar 70 is received within one of the notches 166 such that the drive chain 154 can pull the shopping cart up the inclined conveyor or restrict the movement of the shopping cart when used in connection with a downwardly moving inclined conveyor. An advantage of the embodiment illustrated in FIGS. 21 and 22 is the ability for the inclined conveyor to be used with a conventional shopping cart that does not need an engagement bracket 80 mounted to its front end.

Figure 23:
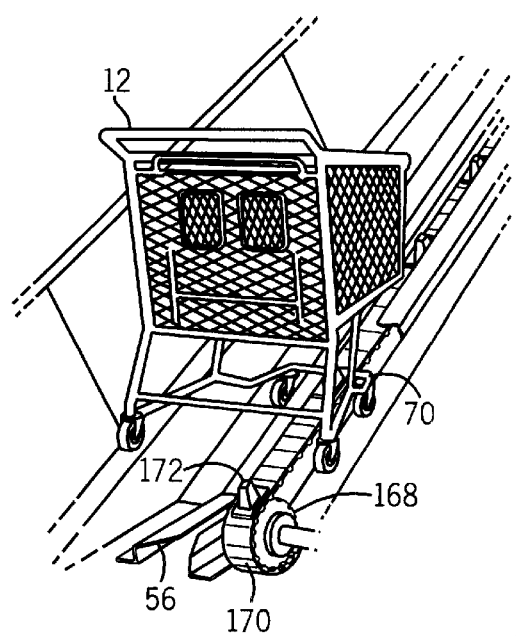
FIG. 23 is a third alternate embodiment of the engagement between he conveyor assembly and the shopping cart.

Referring now to FIG. 23, thereshown is an additional alternate embodiment of the conveyor assembly of the present invention. In the embodiment illustrated in FIG. 23, the conveyor assembly includes an idler sprocket wheel 168 that receives a belt 170 that includes a series of spaced drive pegs 172. In the embodiment of FIG. 23, each of the drive pegs 172 has a sufficient height to engage the front cross bar 70 of the shopping cart 12 such that the shopping cart does not include a separate engagement bracket as was the case in the first embodiment. In the embodiment of the invention illustrated in FIG. 23, the drive peg 172 is able to move the shopping cart along the length of the inclined conveyor. However, a disadvantage of the embodiment illustrated in FIG. 23 is the fact that the shopping cart is not captured between the pair of cover plates 56. Thus, the shopping cart can move laterally along the width of the inclined conveyor.

Figure 24:
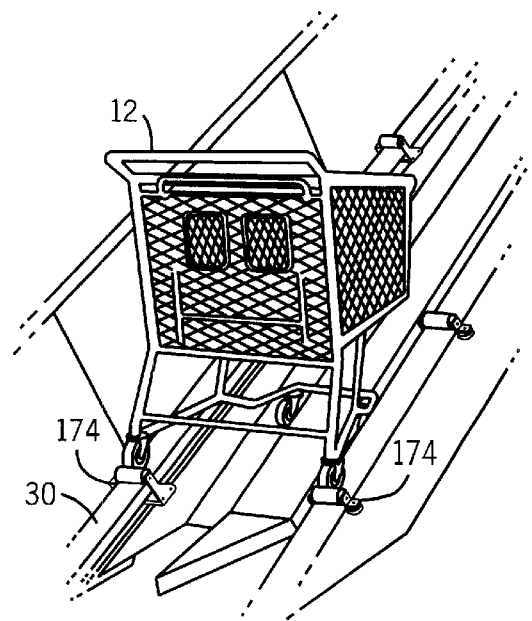
FIG. 24 is a fourth alternate embodiment of the engagement between he conveyor assembly and the shopping cart.

Referring now to FIG. 24, thereshown is yet another alternate embodiment of the invention. In this embodiment, a pair of driven rollers 174 are positioned to ride along each of the rear wheel tracks 30. In this embodiment, each of the rollers 174 is attached to a driven belt and is able to move the shopping cart 12 along the length of the inclined conveyor. Again, a disadvantage of the embodiment illustrated in FIG. 24 is the ability of the cart to move laterally along the width of the inclined conveyor.

Figure 25:
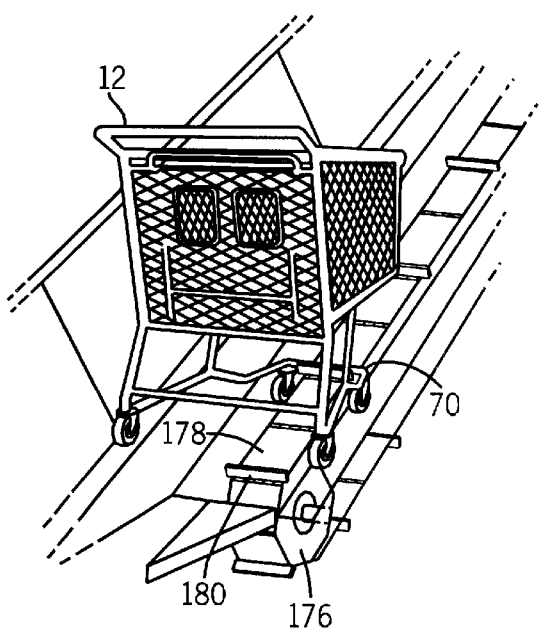
FIG. 25 is a fifth alternate embodiment of the engagement between the conveyor assembly and the shopping cart.

Referring now to FIG. 25, thereshown is yet another alternate embodiment of the conveyor assembly used to move the shopping cart 12 along the inclined conveyor. In the embodiment illustrated in FIG. 25, the idler sprocket wheel 176 receives a driven belt 178 having a plurality of spaced, upwardly extending plates 180. Each of the plates 180 contacts the front cross bar 70 of the shopping cart 12 to move the shopping cart along the length of the inclined conveyor. Again, the embodiment illustrated in FIG. 25 allows the inclined conveyor to operate with conventional shopping carts without the requirement of an additional engagement bracket. However, the shopping cart 12 is able to move laterally with respect to the width of the inclined conveyor.

Various alternatives and embodiments are contemplated as being within the scope of the following claims particularly pointing out and distinctly claiming the subject matter regarded as the invention.

We claim:

1. A combination inclined tow conveyor and shopping cart for moving the shopping cart in a desired direction between an upper floor and a lower floor of a building, the combination comprising:

a pair of spaced front wheel tracks extending between a loading end and an unloading end of the conveyor, each of the front wheel tracks positioned to receive one of a pair of front wheels contained on the shopping cart;

a pair of spaced back wheel tracks extending between the loading end and the unloading end of the conveyor, each back wheel track positioned to receive one of a pair of back wheels contained on the shopping cart, wherein the front wheel tracks and the back wheel tracks are inclined from the lower floor to the upper floor to guide the movement of the shopping cart therebetween;

a driven continuous conveyor positioned to engage the shopping cart and move the shopping cart in the desired direction along the front wheel tracks and the rear wheel tracks between the upper floor and the lower floor; and a cart arrester positioned along the inclined tow conveyor, the cart arrester being operable to allow movement of the shopping cart in the desired direction and to prevent unrestricted movement of the shopping cart in an opposite, undesired direction along the inclined tow conveyor.

2. The combination of claim 1 wherein the continuous conveyor includes a continuous conveyor belt extending between the infeed end and the discharge end of the conveyor, the continuous conveyor belt including a plurality of spaced drive lugs extending from the conveyor belt, wherein the drive lugs engage the shopping cart to move the shopping cart between the upper floor and the lower floor.

3. The combination of claim 2 wherein the shopping cart includes a front cross bar, wherein the drive lugs of the continuous conveyor belt engage the cross bar of the shopping cart.

4. The combination of claim 3 wherein the front cross bar is attached to a pair of side rails of the shopping cart.

5. A combination inclined tow conveyor and shopping cart for moving the shopping cart in a desired direction between an upper floor and a lower floor of a building, the combination comprising:

a pair of spaced front wheel tracks extending between a loading end and an unloading end of the conveyor, each of the front wheel tracks positioned to receive one of a pair of front wheels contained on the shopping cart;

a pair of spaced back wheel tracks extending between the loading end and the unloading end of the conveyor, each back wheel track positioned to receive one of a pair of back wheels contained on the shopping cart, wherein the front wheel tracks and the back wheel tracks are inclined from the lower floor to the upper floor to guide the movement of the shopping cart therebetween;

a driven continuous conveyor positioned to engage the shopping cart and move the shopping cart in the desired direction along the front wheel tracks and the rear wheel tracks between the upper floor and the lower floor; and a heat sensor positioned at the loading end of the inclined conveyor to detect the presence of heat generated by a person at the loading end, wherein the heat sensor prevents operation of the drive motor upon detection of heat from a person.

6. A combination inclined tow conveyor and shopping cart for moving the shopping cart in a desired direction between an upper floor and a lower floor of a building, the combination comprising:

a pair of spaced front wheel tracks extending between a loading end and an unloading end of the conveyor, each of the front wheel tracks positioned to receive one of a pair of front wheels contained on the shopping cart;

a pair of spaced back wheel tracks extending between the loading end and the unloading end of the conveyor, each back wheel track positioned to receive one of a pair of back wheels contained on the shopping cart, wherein the front wheel tracks and the back wheel tracks are inclined from the lower floor to the upper floor to guide the movement of the shopping cart therebetween;

a driven continuous conveyor positioned to engage the shopping cart and move the shopping cart in the desired direction along the front wheel tracks and the rear wheel tracks between the upper floor and the lower floor; and a pair of sensors spaced along the loading end of the inclined conveyor to detect the presence of an object at the loading end, wherein simultaneous detection of an object by the sensors prevents operation of the drive motor.

7. A combination inclined tow conveyor and shopping cart for moving the shopping cart in a desired direction between an upper floor and a lower floor of a building, the combination comprising:

a pair of spaced front wheel tracks extending between a loading end and an unloading end of the conveyor, each of the front wheel tracks positioned to receive one of a pair of front wheels contained on the shopping cart;

a pair of spaced back wheel tracks extending between the loading end and the unloading end of the conveyor, each back wheel track positioned to receive one of a pair of back wheels contained on the shopping cart, wherein the front wheel tracks and the back wheel tracks are inclined from the lower floor to the upper floor to guide the movement of the shopping cart therebetween;

a driven continuous conveyor positioned to engage the shopping cart and move the shopping cart in the desired direction along the front wheel tracks and the rear wheel tracks between the upper floor and the lower floor; and a pair of sensors spaced along the unloading end of the inclined conveyor to detect the presence of an object at the unloading end, wherein simultaneous detection of an object by the sensors prevents operation of the drive motor.

8. A combination inclined tow conveyor and shopping cart for moving the shopping cart in a desired direction between an upper floor and a lower floor of a building, the combination comprising:

a pair of spaced front wheel tracks extending between a loading end and an unloading end of the conveyor, each of the front wheel tracks positioned to receive one of a pair of front wheels contained on the shopping cart;

a pair of spaced back wheel tracks extending between the loading end and the unloading end of the conveyor, each back wheel track positioned to receive one of a pair of back wheels contained on the shopping cart, wherein the front wheel tracks and the back wheel tracks are inclined from the lower floor to the upper floor to guide the movement of the shopping cart therebetween;

a driven continuous conveyor positioned to engage the shopping cart and move the shopping cart in the desired direction along the front wheel tracks and the rear wheel tracks between the upper floor and the lower floor; and a jam detector positioned to detect the restricted movement of the shopping cart relative to the movement of the driven continuous conveyor, wherein the jam detector prevents further operation of the continuous conveyor upon detection of the restricted movement of the shopping cart.

9. the combination of claim 8 wherein the jam detector includes a pair of electrified conductor strips extending along the length of the inclined conveyor, wherein the restricted movement of the shopping cart relative to the movement of the continuous conveyor causes the shopping cart to contact the pair of electrified strips.

10. The combination of claim 2 wherein the conveyor belt and drive lugs are formed from elastic material.

11. An inclined tow conveyor for moving a shopping cart in a sired direction between an upper floor and a lower floor, the shopping cart including a pair of spaced front wheels and a pair of spaced back wheels, the inclined conveyor comprising:

a pair of spaced front wheel tracks extending between a loading end and an unloading end of the inclined conveyor, each of the front wheel tracks positioned to receive one of the front wheels of the shopping cart;

a pair of spaced back wheel tracks extending between the loading end and the unloading end of the conveyor, each of the back wheel tracks positioned to receive one of the back wheels of the shopping cart, wherein the front wheel tracks and the back wheel tracks are inclined and extend from the lower floor to the upper floor to guide the movement of the cart therebetween;

a driven continuous conveyor belt including a series of spaced drive lugs engageable with the shopping cart to move the shopping cart in the desired direction along the front wheel tracks and the rear wheel tracks between the upper floor and the lower floor; and at least one cart arrester positioned along the inclined tow conveyor, wherein the cart arrester permits movement of the shopping cart in the desired direction while preventing movement of the shopping cart in an opposite, undesired direction.

12. An inclined tow conveyor for moving a shopping cart in a desired direction between an upper floor and a lower floor, the shopping cart including a pair of spaced front wheels and a pair of spaced back wheels, the inclined conveyor comprising:

a pair of spaced front wheel tracks extending between a loading end and an unloading end of the inclined conveyor, each of the front wheel tracks positioned to receive one of the front wheels of the shopping cart;

a pair of spaced back wheel tracks extending between the loading end and the unloading end of the conveyor, each of the back wheel tracks positioned to receive one of the back wheels of the shopping cart, wherein the front wheel tracks and the back wheel tracks are inclined and extend from the lower floor to the upper floor to guide the movement of the cart therebetween;

a driven continuous conveyor belt including a series of spaced drive lugs engageable with the shopping cart to move the shopping cart along the front wheel tracks and the rear wheel tracks between the upper floor and the lower floor; and a heat sensor positioned at the loading end of the conveyor to detect the presence of heat generated by a person at the loading end, wherein the heat sensor prevents operation of the continuous conveyor belt upon detection of heat from a person.

13. An inclined tow conveyor for moving a shopping cart in a desired direction between an upper floor and a lower floor, the shopping cart including a pair of spaced front wheels and a pair of spaced back wheels, the inclined conveyor comprising:

a pair of spaced front wheel tracks extending between a loading end and an unloading end of the inclined conveyor, each of the front wheel tracks positioned to receive one of the front wheels of the shopping cart;

a pair of spaced back wheel tracks extending between the loading end and the unloading end of the conveyor, each of the back wheel tracks positioned to receive one of the back wheels of the shopping cart, wherein the front wheel tracks and the back wheel tracks are inclined and extend from the lower floor to the upper floor to guide the movement of the cart therebetween;

a driven continuous conveyor belt including a series of spaced drive lugs engageable with the shopping cart to move the shopping cart along the front wheel tracks and the rear wheel tracks between the upper floor and the lower floor; and a pair of spaced sensors positioned at the loading end of the inclined conveyor to detect the presence of an object at the loading end, wherein the sensors prevent operation of the drive motor when both of the sensors simultaneously sense an object.

14. The inclined tow conveyor of claim 13 further comprising a second pair of spaced sensors positioned at the unloading end of the inclined conveyor to detect the presence of an object at the unloading end, wherein the sensors prevent operation of the drive motor upon the simultaneous detection of an object by the sensors.

15. An inclined tow conveyor for moving a shopping cart in a desired direction between an upper floor and a lower floor, the shopping cart including a pair of spaced front wheels and a pair of spaced back wheels, the inclined conveyor comprising:

a pair of spaced front wheel tracks extending between a loading end and an unloading end of the inclined conveyor, each of the front wheel tracks positioned to receive one of the front wheels of the shopping cart;

a pair of spaced back wheel tracks extending between the loading end and the unloading end of the conveyor, each of the back wheel tracks positioned to receive one of the back wheels of the shopping cart, wherein the front wheel tracks and the back wheel tracks are inclined and extend from the lower floor to the upper floor to guide the movement of the cart therebetween;

a driven continuous conveyor belt including a series of spaced drive lugs engageable with the shopping cart to move the shopping cart along the front wheel tracks and the rear wheel tracks between the upper floor and the lower floor; and a jam detector positioned along the length of the inclined conveyor to detect the restricted movement of the shopping cart relative to the movement of the conveyor belt, the jam detector being operable to prevent operation of the conveyor belt upon detection of the restricted movement of the shopping cart along the inclined conveyor.

16. The inclined tow conveyor of claim 15 wherein the jam detector includes a pair of conductor strips extending along the length of the conveyor belt, wherein a jam of the shopping cart causes the shopping cart to electrically connect the conductor strips.

17. An inclined tow conveyor for moving a shopping cart in a desired direction between an upper floor and a lower floor, the shopping cart including a pair of spaced front wheels and a pair of spaced back wheels, the inclined conveyor comprising:

a pair of spaced front wheel tracks extending between a loading end and an unloading end of the inclined conveyor, each of the front wheel tracks positioned to receive one of the front wheels of the shopping cart;

a pair of spaced back wheel tracks extending between the loading end and the unloading end of the conveyor, each of the back wheel tracks positioned to receive one of the back wheels of the shopping cart, wherein the front wheel tracks and the back heel tracks are inclined and extend from the lower floor to the upper floor to guide the movement of the cart therebetween;

a driven continuous conveyor belt including a series of spaced drive lugs engageable with the shopping cart to move the shopping cart along the front wheel tracks and the rear wheel tracks between the upper floor and the lower floor; and means for preventing unrestricted movement of the shopping cart in an undesired direction along the inclined conveyor.

18. A combination inclined conveyor and shopping cart for moving the shopping cart between an upper floor and lower floor, the combination comprising:
- a shopping cart having a pair of spaced front wheels and a pair of spaced back wheels;
- an engagement member extending beneath the shopping cart and positioned between the pair of front wheels; and
- a driven continuous conveyor belt extending along the length of the inclined conveyor between a loading end and an unloading end of the inclined conveyor, the conveyor belt including a plurality of spaced drive lugs that contact the engagement member formed on the shopping cart such that movement of the conveyor belt in a desired direction causes the drive lugs to contact the engagement member on each shopping cart to move the shopping cart in the desired direction; and
- a cart arrester positioned along the length of the inclined conveyor, the cart arrester being operable to allow passage of the shopping cart in the desired direction and prevent passage of the shopping cart in an opposite, undesired direction.

19. The combination of claim 18 further comprising a jam detector positioned along the length of the inclined conveyor, the jam detector being operable to prevent movement of the conveyor belt upon detection of a jam of the shopping cart along the continuous conveyor belt.

20. The combination of claim 19 wherein the jam detector includes a pair of conductor strips extending along the length of the continuous conveyor belt, wherein a jam of the shopping cart causes the shopping cart to contact the pair of electrified strips.

21. The combination of claim 20 wherein the engagement member includes a horizontal cross bar that is positioned beneath the conductor strips during normal operation of the conveyor belt, wherein the cross bar contacts the conductor strips during a jam of the shopping cart.

22. The combination of claim 21 further comprising a pair of cover members extending along the length of the continuous conveyor belt between the loading end and the unloading end of the inclined conveyor, the pair of cover members being positioned above the continuous conveyor belt and spaced by a guide slot, wherein the horizontal cross bar is positioned beneath the cover members when the shopping cart is engaged by the drive lugs of the conveyor belt.

23. The combination of claim 22 wherein each of the conductor strips is mounted to one of the cover members.

24. The combination of claim 19 further comprising a heat sensor positioned at the loading end of the conveyor, wherein the heat sensor prevents operation of the continuous conveyor belt upon detection of heat from a person.

* * * * *